United States Patent [19]

Nelle

[11] Patent Number: 4,573,000

[45] Date of Patent: Feb. 25, 1986

[54] MEASURING INSTRUMENT

[75] Inventor: Günther Nelle, Bergen, Fed. Rep. of Germany

[73] Assignee: Dr. Johannes Heidenhain GmbH, Traunreut, Fed. Rep. of Germany

[21] Appl. No.: 653,677

[22] Filed: Sep. 21, 1984

[30] Foreign Application Priority Data

Sep. 23, 1983 [DE] Fed. Rep. of Germany ....... 3334398

[51] Int. Cl.$^4$ .............................. G05B 1/06
[52] U.S. Cl. .................... 318/640; 356/375; 250/237 G
[58] Field of Search ........... 318/640, 377, 480; 356/373, 374, 375; 250/237 G; 33/125 R

[56] References Cited

U.S. PATENT DOCUMENTS

| | | | |
|---|---|---|---|
| 2,694,804 | 11/1954 | Wagner | 318/640 |
| 4,074,131 | 2/1978 | Schwebel | 356/375 X |
| 4,295,742 | 10/1981 | Nell et al. | 356/375 X |
| 4,297,033 | 10/1981 | Nelle et al. | 356/374 |
| 4,403,859 | 9/1983 | Ernst | 356/375 |
| 4,462,159 | 7/1984 | Nelle | 356/374 |
| 4,490,914 | 1/1985 | Spies | 356/374 |
| 4,492,032 | 1/1985 | Nelle | 33/125 R |
| 4,527,056 | 7/1985 | Burkhardt et al. | 250/237 G |

FOREIGN PATENT DOCUMENTS 2511350 10/1975 Fed. Rep. of Germany .
2952106 11/1982 Fed. Rep. of Germany .

Primary Examiner—B. Dobeck
Attorney, Agent, or Firm—Willian Brinks Olds Hofer Gilson & Lione Ltd.

[57] ABSTRACT

In an incremental measuring instrument for measuring the relative position of two objects, of the type including reference marks absolutely positioned with respect to a graduation of a scale, a first scanning plate with scanning fields for the graduation is provided in a scanning unit which is shiftable on a guide independent of the guide of the objects to be measured. The second scanning plate is connected to the first scanning plate by means of a coupling which is rigid in the measuring direction. In this way the separation of the first and second scanning plates with respect to the scale can be adjusted independently for optimal scanning of both the graduation and the reference marks.

8 Claims, 6 Drawing Figures

MEASURING INSTRUMENT

BACKGROUND OF THE INVENTION

This invention relates to an improvement to measuring instruments for measuring the relative position of two objects shiftable with respect to one another in a first guide, of the type comprising a scale which defines a measuring graduation extending along a measuring direction, at least one reference mark absolutely positioned with respect to the graduation, a scanning unit adapted to scan both the graduation and the reference mark and to generate scanning signals in response thereto, and an evaluating unit coupled to receive the scanning signals.

In such a measuring insrument the electrical control impulses generated by means of the reference marks can be used in various ways. For example, such control impulses can be used to set a reproducible zero position in the evaluating unit, to load a predetermined position value at the beginning of the measurement operation, or to monitor the measured position value against interference impulses, as well as to act on a control arrangement engaged on the outlet side of the evaluating unit.

In West German patent DE-PS No. 29 52 106 there is described an incremental length or angle measuring instrument in which a scale is provided which defines a graduation and an array of reference marks alongside the graduation. Each of the reference marks is provided with a different line-group distribution. The individual reference marks are scanned by scanning fields on a scanning plate in a scanning unit, each scanning field being clearly allocated to a respective one of the reference marks, because the allocated scanning field has the same line-group distribution as the respective reference mark. In order to provide clear, unambiguous scanning of these reference marks, the spacing between the scale and the scanning plate is preferably at most no more than about $2d^2/\lambda$ because of the irregular line-group distributions. In the foregoing expression the symbol d has been used to signify the width of the narrowest line of the line division of the reference marks and $\lambda$ has been used to signify the center-of-gravity wavelength of the illuminating light.

It is also known that in order to obtain optimum scanning of a regular periodic incremental graduation of a scale, the separation between the scale and the scanning plate is not limited to only a single definite spacing. Rather, a number of different spacings are possible. If the graduation of a scale is illuminated by collimated light having a parallel beam course, then there are certain planes behind the graduation plane of the scale which can be scanned with scanning graduations of like grid constant in an optimal manner. This is due to interference effects of the light rays diffracted by the graduations of the scale, which produce diffraction images of the graduation of the scale. With a grid constant $P_M$ of the graduation of the scale and a center-of-gravity wavelength $\lambda$ of the light, these planes have spacings $n \cdot p_M^2/\lambda$ ($n = 0, 1, 2 \ldots$) from the graduation plane of the scale. Optimal electric scanning signals can therefore be generated at spacings between the graduation of the scanning plate and the graduation plane of the scale equal to $n \cdot p_M^2/\lambda$ (Machine Shop Magazine, April 1962, page 208). The use of greater spacings between the scale and the scanning plate brings important advantages in that spacing tolerances are often greater with greater spacings, in which case lower demands have to be made on the precision guiding of the scanning plate with respect to the scale. Furthermore, with greater spacings the periodic scanning signals generated in the scanning of the incremental graduation of the scale have a more sinusoidal wave form, so that the signal period of the scanning signals can better be subdivided by interpolation techniques. The utilization of very large spacings between the scale and the scanning plate in the scanning of the incremental graduation is possible without interposed focussing optics only in measuring instruments in which the scale of the instrument includes no reference marks. This is because the clear scanning of the reference marks as set out above requires a predetermined small spacing between the scale and the scanning plate which must not be exceeded.

SUMMARY OF THE INVENTION

The present invention is directed to an improved measuring instrument of the type having reference marks provided on the scale in which clear scanning of the reference marks and optimal scanning of the graduation of the scale are both made possible, without interposed focussing optics.

According to this invention a measuring instrument of the type described initially above is provided with means for rigidly mounting the scanning unit with respect to one of the two objects to be measured so that the scanning unit is guided by the first guide. The first scanning plate is fixedly mounted to the scanning unit to scan the graduation, and this first scanning plate defines at least one graduation scanning field aligned with the graduation. A second scanning plate is provided which defines at least one reference mark scanning field adapted to scan the reference mark. An auxiliary guide, which is independent of the first guide, guides the second scanning plate with respect to the reference mark, and a coupling is provided between the second scanning plate and the first scanning plate, which coupling is rigid in the measuring direction.

The present invention provides important advantages, particularly in that when measuring instruments of the type described above are provided with separate scanning plates for the graduation and the reference marks of the scale, and when the separate scanning plates are provided with separate guides, the most favorable spacings in each case for optimal scanning of the incremental graduation and the reference marks of the scale can be obtained. In this way both the measuring accuracy and the degree to which interpolation techniques can be used to subdivide the measuring value can be increased. By providing larger spacings between the graduation of the scale and the associated scanning fields of the first scanning plate, lower demands can be placed upon the guidance accuracy of this scanning plate, since larger spacing tolerances typically are associated with larger spacings. Accordingly, in such a measuring instrument in which a predetermined small spacing between the reference marks and the associated scanning fields must not be exceeded, no high-precision guides need be provided for the first scanning plate for the scanning of the graduation of the scale. Since the first scanning plate is not guided on the auxiliary guide for the second scanning plate no measuring errors arise through reversal spans ("Umkehrspannen") whih necessarily arise in the auxiliary guide in a guide affected by friction. The proposed simple measures do not result in any changes of the outside dimensions of the measuring instrument and therefore the flexibility of use of the measuring instrument is not impaired. Further advantageous features of the invention are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
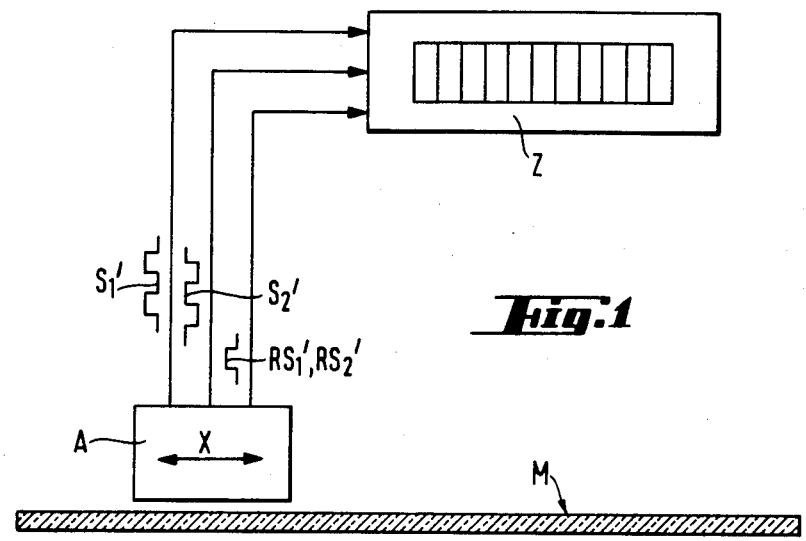
FIG. 1 is a schematic representation of an incremental measuring instrument which incorporates a presently preferred embodiment of this invention.
Figure 2:
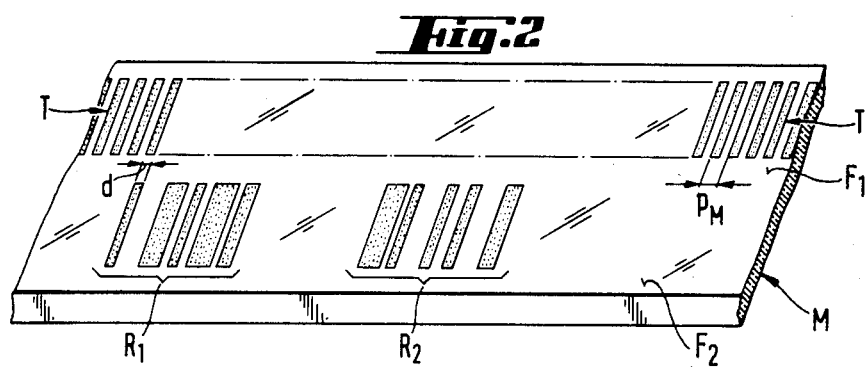
FIG. 2 is a partial perspective view of the measuring scale of the measuring instrument of FIG. 1.
Figure 5:
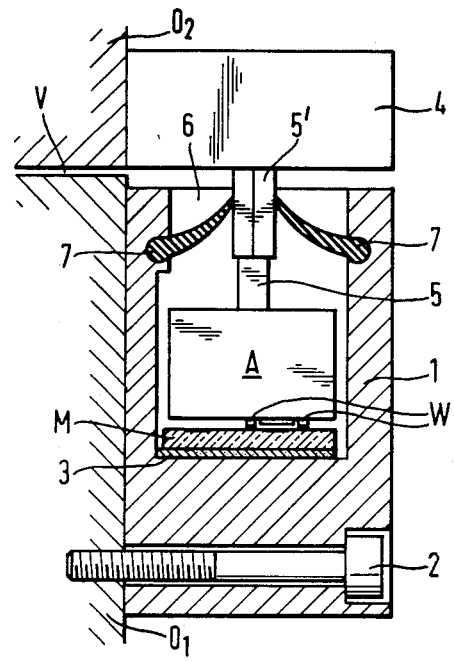
FIG. 5 is a cross sectional view of the incremental measuring instrument of FIG. 1.

Turning now to the drawings, FIG. 1 schematically represents a photoelectric incremental length measuring instrument which incorporates a presently preferred embodiment of this invention. This measuring instrument includes a scale M and a scanning unit A, which are connected respectively with the objects $O_1$, $O_2$, the position of which is to be measured. The objects $O_1$, $O_2$, can for example take the form of machine parts of a processing machine, as shown in FIG. 5. As shown in FIG. 2 the scale M acts as a carrier for an incremental measuring graduation T in the form of a line grid, which is scanned photoelectrically in direct light by the scanning unit A. Alongside the graduation T there are arranged two reference marks $R_1$, $R_2$ on the scale M. The reference marks $R_1$, $R_2$ are both absolutely allocated to respective predetermined positions along the graduation T. Each of the reference marks $R_1$, $R_2$ is made up of a respective group of lines having an irregular line distribution. Preferably, the line distributions of the two reference marks $R_1$, $R_2$ are as dissimilar as possible from one another.

The scanning unit A generates periodic scanning signals $S_1$, $S_2$ in the scanning of the graduation T as the scanning unit A moves along the measuring direction X with respect to the scale M. These scanning signals $S_1$, $S_2$ are amplified in the scanning unit A and transformed into square wave signals $S_1'$, $S_2'$, which are applied to control an electronic counter Z which counts and displays the measuring values in digital form. The square wave signals $S_1'$, $S_2'$, are displaced with respect to one another by a quarter of the grid constant $p_M$ (graduation period) of the graduation T in order to alow discrimination of the scanning direction. The scanning unit A likewise generates reference signals $RS_1$, $RS_2$ in response to scanning of the reference marks $R_1$, $R_2$. These reference signals $RS_1$, $RS_2$ are likewise amplified in the scanning unit A, transformed into square wave signals $RS_1'$, $RS_2'$, and applied to the counter Z.

The reference signals $RS_1'$, $RS_2'$, can be used to trigger various functions. For example, by evaluating the reference signals $RS_1'$, $RS_2'$, an incremental measuring instrument can be made to operate as a quasiabsolute measuring instrument, if to each reference mark $RS_1$, $RS_2$ there is allocated a number that represents its absolute position with respect to an invariable zero point. Furthermore, a predetermined one of the reference marks $R_1$, $R_2$ can serve the purpose of setting the counter Z to the value "zero" when the respective reference signal $RS_1'$, $RS_2'$ obtained from the selected reference mark $R_1$, $R_2$ is detected.

Figure 3:
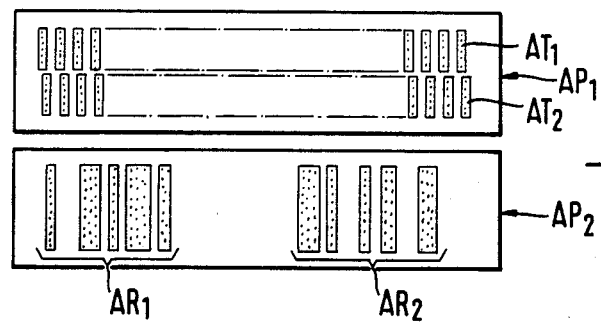
FIG. 3 is a plan view of two scanning plates with respective scanning fields included in the measuring instrument of FIG. 1.

As shown in FIG. 3 a first scanning plate $AP_1$ is provided in the scanning unit A for the scanning of the graduation T of the scale M. This scanning plate $AP_1$ defines two scanning fields $AT_1$, $AT_2$, which are offset with respect to one another by a quarter of the grid constant $p_M$. The scanning fields $AT_1$, $AT_2$ are identical in grid constant to the graduation T. A respective photoelectric sensing element (not shown) is included in the scanning unit A for each of the scanning fields $AT_1$, $AT_2$ for the generation of the scanning signals $S_1$, $S_2$. A second scanning plate $AP_2$ is provided in the scanning unit A for the scanning of the reference marks $R_1$, $R_2$. This second scanning plate $AP_2$ defines scanning fields $AR_1$, $AR_2$, as shown in FIG. 3. The line-group distributions of the individual scanning fields $AR_1$, $AR_2$ are identical with the line-group distributions of the respective allocated ones of the reference marks $R_1$, $R_2$. For this reason, when either of the reference marks $R_1$, $R_2$ is aligned with the associated scanning field $AR_1$, $AR_2$, the associated reference signal $RS_1$, $RS_2$ is generated respectively. Because of the identity between the line distribution of the reference mark $RS_1$ and the scanning field $AR_1$ on the one hand and of the line distribution of the reference mark $RS_2$ and the scanning field $AR_2$, on the other hand, it is insured that only the scanning field $AR_1$, $AR_2$ associated to the respective reference mark $R_1$, $R_2$ can bring forth a reference signal $RS_1$, $RS_2$ with a sufficiently high signal to noise ratio. If, for example, the scanning field $AR_1$ is moved past the nonassociated reference mark $R_2$, no reference signal is generated.

Figure 4:
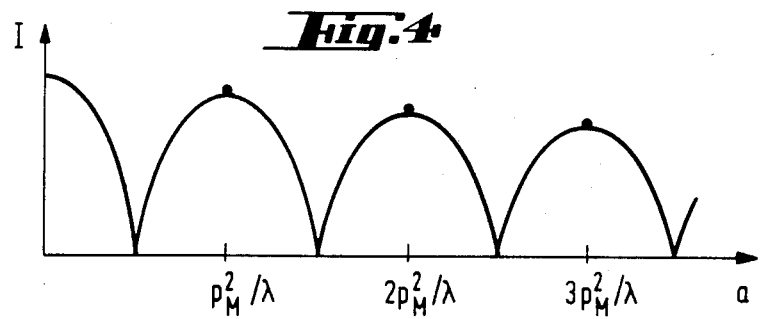
FIG. 4 is a graph representing the amplitudes of light modulation obtained with the measuring instrument of FIG. 1.

In this embodiment the periodic incremental graduation T of the scale M is illuminated and permeated by collimated, parallel beam light. As explained previously, diffraction patterns of the graduation T of the scale M arise in certain planes behind the plane of the graduation T of the scale M by virtue of interference of the light rays diffracted by the graduation T of the scale M. These preferred planes have a spacing of $n \cdot p_M^2 / \lambda$ (n=0, 1, 2 ...) from the plane of the graduation T of the scale M. As explained above, $P_M$ represents the grid constant of the graduation T and $\lambda$ represents the center-of-gravity wavelength of the illuminating light. FIG. 4 represents the amplitudes J of the light modulation arising in relative movement between two graduations of equal grid constant as a function of the separation a there between. Optimal electric scanning signals $S_1$, $S_2$ are generated only at spacings equal to $n \cdot p_M^2 / \lambda$ between the plane of the scanning fields $AT_1$, $AT_2$ of the first scanning plate $AP_1$ and the plane of the graduation T of the scale M.

In order to obtain clear, unambiguous scanning of the reference marks $R_1$, $R_2$ on the scale M, the spacing between the reference marks $R_1$, $R_2$ and the associated scanning fields $AR_1$, $AR_2$ on the second scanning plate $AP_2$ in the light beam direction may amount at most to about $2d^2 / \lambda$, where d represents the width of the narrowest line of the line divisions of the reference marks $R_1$, $R_2$. This is due to the irregular spacing of the line group distributions. On the other hand, a explained above for the optimal scanning of the graduation T of the scale M, the spacing between the graduation T and the associated scanning fields $AT_1$, $AT_2$ on the first scanning plate $AP_1$ in the light-beam direction is preferably equal to $n \cdot p_M^2/\lambda$ ($n = 1, 2, 3 \ldots$).

Figure 6:
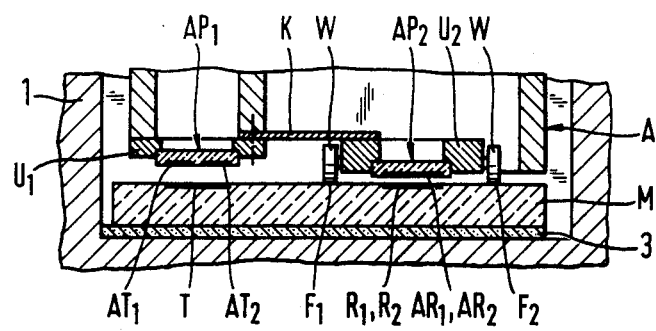
FIG. 6 is an enlarged cross sectional view of a portion of the scanning unit of FIG. 5.

According to this invention as embodied in the structure illustrated in FIGS. 5 and 6, the first scanning plate $AP_1$ which defines the scanning fields $AT_1$, $AT_2$ for the graduation T of the scale M is fixedly mounted in place to the scanning unit A. This scanning unit A is in turn fixedly mounted to one of the two objects to be measured, such that movement of the scanning unit A is guided by the guide V of the objects $O_1$, $O_2$ to be measured. The second scanning plate $AP_2$ which defines the scanning fields $AR_1$, $AR_2$ for the reference marks $R_1$, $R_2$, is moveable on an auxiliary guide independent of the guide V of the objects $O_1$, $O_2$ to be measured, and is connected with the first scanning plate $AP_1$ by a coupling K which is rigid in the measuring direction X.

FIG. 5 represents in cross section an encapsulated incremental measuring instrument in which a housing 1 in the form of a hollow profile is fastened by means of screws 2 to the object $O_1$ (which in this embodiment takes the form of a slide piece of a processing machine, not shown). The scale M is secured to the interior of the housing 1 by means of an adhesive layer 3, such that the scale M can be scanned by the scanning unit A. In this embodiment the other object $O_2$ to be measured takes the form of the bed of the processing machine. A mounting foot 4 is fastened in any suitable manner to the object $O_2$, and this mounting foot 4 is connected by means of a follower 5 to the scanning unit A. the housing 1 defines a slit 6 running in the longitudinal direction, and the slit 6 is closed by opposed sealing lips 7. The follower 5 extends through the slit 6 between the sealing lips 7 into the interior of the housing 1. In the region of the sealing lips 7, the follower 5 defines a zone 5' of sword-shaped cross section. The scanning unit A is connected via the follower 5 and the mounting foot 4 rigidly to the object $O_2$ to be measured, and the scanning unit A is shiftable along the guide V of the objects $O_1$, $O_2$ to be measured in the measuring direction X.

FIG. 6 shows an enlarged sectional view of a portion of the measuring instrument of FIG. 5. FIG. 6 shows in greater detail the manner in which the scale M is fastened by means of the adhesive layer 3 to the housing 1 and is scanned by the scanning unit A. The first scanning plate $AP_1$ which defines the scanning fields $AT_1$, $AT_2$ for the scanning of the graduation T of the scale M is arranged by means of a frame $U_1$ fixedly on the scanning unit A. Thus, the first scanning plate $AP_1$ is fixed in position with respect to the object $O_2$ and is shiftable as shown in FIG. 5 on the guide V of the objects $O_1$, $O_2$ to be measured in the measuring direction X. The second scanning plate $AP_2$ which defines the scanning fields $AR_1$, $AR_2$ for the scanning of the reference marks $R_1$, $R_2$ is mounted in a frame $U_2$ which is joined by means of a leaf spring K extending transversely to the measuring direction X with the scanning unit A or the frame $U_1$ of the first scanning plate $AP_1$. This leaf spring K acts as a coupling, rigid in the measuring direction X, between the first scanning plate $AP_1$ and the second scanning plate $AP_2$. On the frame $U_2$ of the second scanning plate $AP_2$ there are arranged rollers W which are guided on guide surfaces $F_1$, $F_2$ defined by the scale M. These guide surfaces $F_1$, $F_2$ on the scale M act as an auxiliary guide which is independent of the guide V of the objects $O_1$, $O_2$ to be measured. This auxiliary guide acts to guide the movement of the second scanning plate $AP_2$. The coupling K in the form of the leaf spring serves simultaneously as a biasing element to bias the second scanning plate $AP_2$ against the guide surfaces $F_1$, $F_2$ of the scale M, so that the desired predetermined spacing between the reference marks $R_1$, $R_2$ and the associated scanning fields $AR_1$, $AR_2$ is consistently obtained. The guide surfaces for the second scanning plate $AP_2$ can be provided either on the scale M and/or on the housing 1 for the scale M. In a manner not shown, the scanning unit A includes both an illuminating arangement as well as photoelectric scanning elements aligned with the scanning fields $AT_1$, $AT_2$, $AR_1$, $AR_2$ for the photoelectric scanning of the scale M.

From the foregoing description it should be apparent that the embodiment described above allows the scanning of the graduation T of the scale M to be accomplished with a larger separation and a larger separation tolerance for the first scanning plate $AP_1$, and the scanning of the reference marks $R_1$, $R_2$ with a lesser separation and a lesser spacing tolerance for the second scanning plate $AP_2$. This invention can be used to particular advantage in other measuring processes in which the graduations of the scale and of the scanning fields of the scanning plate are not identical, for example, in a three-grid measuring system in which the graduation of the scanning field is twice as great as the graduation of the scale. In such three-grid measuring systems (as disclosed for example in West German DE-OS No. 25 11 350) very large spacing with relatively great spacing tolerances can be achieved with nonparallel beam path.

Of course, it should be understood that a wide range of changes and modifications can be made to the preferred embodiments described above. For example, the invention is not restricted to use with photoelectric measuring instruments, but is also suitable for use in magnetic, inductive, and capacitive measuring instruments. It is therefore intended that the foregoing detailed description be regarded as illustrative rather than limiting, and that it be understood that it is the following claims, including all equivalents, which are intended to define the scope of this invention.

I claim:

1. In a measuring instrument for measuring the relative position of two objects shiftable with respect to one another on a first guide, of the type comprising: a scale which defines a measuring graduation extending along a measuring direction, at least one reference mark absolutely positioned with respect to the graduation; a scanning unit adapted to scan both the graduation and the reference mark and to generate scanning signals in response thereto, and an evaluating unit coupled to receive the scanning signals; the improvement comprising:

means for rigidly mounting the scanning unit with respect to one of the two objects such that the scanning unit is guided by the first guide;

a first scanning plate fixedly mounted to the scanning unit to scan the graduation, said first scanning plate defining at least one graduation scanning field aligned with the graduation;

a second scanning plate defining at least one reference mark scanning field adapted to scan the reference mark;

an auxiliary guide, independent of the first guide, which guides the second scanning plate with respect to the reference mark; and a coupling between the second scanning plate and the first scanning plate which is rigid in the measuring direction.

2. The invention of claim 1 wherein the separation between the graduation and the graduation scanning field differs from the separation between the reference mark and the reference mark scanning field.

3. The invention of claim 1 wherein the coupling comprises a leaf spring oriented transversely to the measuring direction.

4. The invention of claim 1 wherein the coupling simultaneously biases the second scanning plate against the auxiliary guide.

5. The invention of claim 3 wherein the leaf spring biases the second scanning plate against the auxiliary guide.

6. The invention of claim 4 wherein the auxiliary guide comprises at least one guide surface defined by the scale.

7. The invention of claim 4 wherein the auxiliary guide comprises at least one guide surface defined by a carrier for the scale.

8. The invention of claim 4 wherein the auxiliary guide comprises at least one guide surface, and wherein the invention further comprises at least one roller coupled to the second scanning plate to support the second scanning plate on the guide surface.

* * * * *